United States Patent [19]

Jacobine et al.

[11] Patent Number: 4,640,940
[45] Date of Patent: Feb. 3, 1987

[54] POLYOL TERMINATED SILICONES AND DERIVATIVES THEREOF

[75] Inventors: Anthony F. Jacobine, Meriden; David M. Glaser, New Britain, both of Conn.

[73] Assignee: Loctite Corporation, Newington, Conn.

[21] Appl. No.: 765,292

[22] Filed: Aug. 13, 1985

[51] Int. Cl.$^4$ .............................................. C08F 2/46
[52] U.S. Cl. ........................................ 522/99; 528/26;
528/374; 556/460; 556/440; 556/429
[58] Field of Search .................... 532/99; 528/26, 374;
556/460, 440, 429

[56] References Cited

U.S. PATENT DOCUMENTS

| 4,293,397 | 10/1981 | Sato et al. | 204/159.13 |
| 4,348,454 | 9/1982 | Eckberg | 528/26 |
| 4,387,240 | 6/1983 | Berg | 556/440 |
| 4,424,328 | 1/1984 | Ellis | 526/2.79 |
| 4,504,629 | 3/1985 | Lien et al. | 525/288 |
| 4,507,187 | 3/1985 | Jacobine | 522/99 |
| 4,534,838 | 8/1985 | Lin et al. | 528/26 |

FOREIGN PATENT DOCUMENTS

| 20051 | 11/1983 | Australia . |
| 127321 | 5/1984 | European Pat. Off. . |
| 86/00322 | 1/1986 | World Int. Prop. O. . |

OTHER PUBLICATIONS

R. P. Eckberg, "Radiation Curable Silicones", Radcure VII Proceedings (1984).
G. R. Newkome et al., J. Org. Chem., 50, 2003–2004 (1985).

Primary Examiner—Melvyn I. Marquis

Attorney, Agent, or Firm—Walter j. Steinkraus; Eugene F. Miller

[57] ABSTRACT

Polyorganosiloxane polymers which include at least one group of the formula:

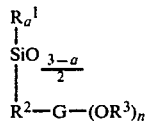

where $R^1$ is an organo group; $R^2$ is alkylene or alkenylene; G is a n+1 valent hydrocarbon, oxyhydrocarbon or poly(oxyhydrocarbon) radical in which some or all of the hydrogen atoms may optionally be substituted by halogen atoms; $R^3$ is H or an organic functional group, particularly polymerizable groups, polymerization accelerating groups or polymerization initiating groups; n is an integer of 2 or more provided that when n is 2 and one of $R^3$ is H, the other $R^3$ group is also H; and a is 0, 1 or 2.

Additional polyorganosiloxane polymers include at least one group of the formula:

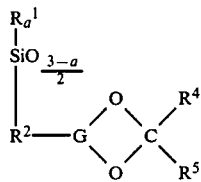

where $R^4$ $R^5$ are H or a mono valent hydrocarbon group.

24 Claims, No Drawings

POLYOL TERMINATED SILICONES AND DERIVATIVES THEREOF

BACKGROUND OF THE INVENTION

Silicones (polyorganosiloxanes) having acrylic, epoxy, photoinitating or other organic functional groups bound to silicon atoms by various linkages are well known. Recently, there have been described silicones with cluster acrylic functionality, that is multiple acrylic groups spatially concentrated near each other. Thus, in U.S. Pat. No. 4,387,240 there are described low molecular weight oligomers having a high methacrylate density which may be represented by the formula:

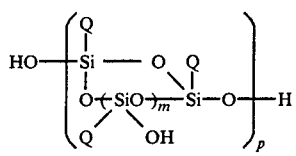

Where m is 1, 2 or 3; p is 2-10 and Q is methacryloxypropyl or similar groups. These oligomers are used as binders in dental filling compositions to give hard abrasion resistant cured fillings. Also, in U.S. Pat. No. 4,424,328 there are described branched low molecular weight siloxane compounds with 3 or 4 of the branches terminated with methacryloxypropyl groups. These compounds are used in the preparation of hard contact lenses.

In copending applications, U.S. Ser. Nos. 623,759, now U.S. Pat. No. 4,575,546, 623,760, now U.S. Pat. No. 4,575,545 and 723,791, filed June 22, 1984, now abandoned, it is disclosed that good elastomeric properties and much more rapid cure times are obtained by block silicones of the formula $(AB)_nC$ where A is a relatively short polymer segment containing at least 3 siloxane repeat units having acrylic functionality, B is a longer segment containing no acrylic functionality and C is A or a triorganosilyl group such as methacryloxypropyldimethylsilyl. See also U.S. Pat. No. 4,504,629.

In Au20051/83 there are disclosed reaction products of silicone carbinols, diisocyanates and hydroxy functional ethylenically unsaturated compounds such as hdyroxyethyl methacrylate. This reference suggests, does not exemplify the use of triisocyanates and/or polyacrylic hydroxyl compounds such as pentaerithitol di- or tri-acrylate. Such products are disclosed as useful for contact lenses where high oxygen permeability is desired. It is well known, however, that urethane linkages have poor high temperature resistance and the oxygen permeability of the silicone portion of the molecule would be expected to further errode the high temperature stability of the urethane linkage.

In U.S. Pat. No. 4,293,397 there are disclosed silicones of the general formula:

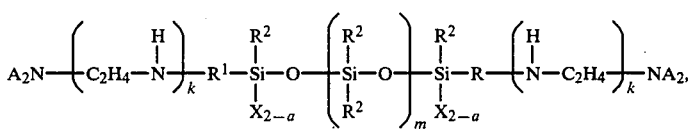

where $R^1$ is a divalent hydrocarbon group, $R^2$ is a monovalent hydrocarbon group, X is a hydroxy group or a hydrolyzable group, k is 0 or a positive integer not exceeding 4, m is a positive integer from 50 to 10,000, a is 0, 1 or 2 and at least two of the groups denoted by A in the molecule are each a acryloxy-containing group represented by the formula.

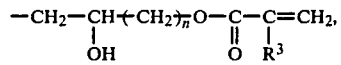

$R^3$ being a hydrogen atom or an alkyl group having from 1 to 4 carbon atoms and n being a integer from 1 to 10, the remainder of A being each a hydrogen atom.

DESCRIPTION OF THE INVENTION

The present invention pertains to novel silicone polymers, that is polyorganosiloxanes, which include at least one group of the formula:

$$\begin{array}{c} R_a^1 \\ | \\ SiO_{\frac{3-a}{2}} \\ | \\ R^2-G-(OR^3)_n \end{array} \qquad \text{I}$$

where $R^1$ is an organo group; $R^2$ is alkylene or alkenylene; G is a n+1 valent hydrocarbon, oxyhydrocarbon or poly(oxyhydrocarbon) radical in which some or all of the hydrogen atoms may optionally be substituted by halogen atoms; $R^3$ is H or an organic functional group, particularly polymerizable groups, polymerization accelerating groups or polymerization initiating groups; n is an integer of 2 or more provided that when n is 2 and one of $R^3$ is H, the other $R^3$ group is also H; and a is 0, 1 or 2.

In the prefered polymers of the invention, a poly dihydrocarbyl siloxane is capped with groups of the above formula where $R^1$ is methyl, a is 2, $R^2$ is alklyene and the $R^3$ groups are the same or different groups selected from groups having (meth)acrylic or epoxy functionality, N-tosylcarbamyl, H, or optionally substituted styryl groups.

A further aspect of the invention are useful intermediate compounds having groups defined by the formula

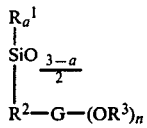

where $R^4$ and $R^5$ are H or a mono valent hydrocarbon group.

Examples of polymerizable groups $R^3$ are H; (meth)aryl; (meth)acryloxyethylcarbamyl; styryl, particularly p-vinylphenyl, p-isopropenylphenyl and p-(1-propenyl)phenyl, any of which may optionally be substituted in the meta positions with alkyl or alkoxy groups; cinnamyl; alkenyl, such as vinyl or allyl; mercaptoacetyl; epoxy functional groups such as glycidyl; and isocyanato functional groups derived from the reaction of a polyol functional silicone of the invention ($R^2$ in formula 1 is H) with a diisocyanate such as toluene diisocyanate, isopherone diisocyanate or other compounds described at pages 28–29 of Au 20051/83.

Examples of groups which may be used to initiate or accelerate polymerization are photoinitiating groups formed by etherification or transetherification reactions using the polyol silicones of the invention and ether or OH functional compounds such as:

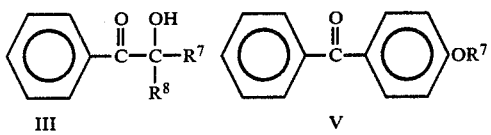

where $R^7$ is H or alkyl and $R^8$ is hydrocarbyl or $R^7$ and $R^8$ together with the carbon atom to which they are attached comprise a cyclic hydrocarbon group.

Other polymerization initiating groups include peroxide, hydroperoxide or perester groups obtained by the reaction of hydroxyl functional polymers with organic hydroperoxides, $H_2O_2$ or peracid compounds respectively.

Polymerization accelerating groups include reaction products of p-toluenesulfonylisocyanate or chlorosulfonylisocyanate with the silicone polyols of the invention. The resulting functionalities are useful accelerators for peroxy initiated acrylic polymerization. Further description of these accelerating functionalities and compositions in which they are useful are described in U.S. Pat. No. 4,513,127 and in copending application 675,387 filed Nov. 27, 1984, incorporated herein by reference.

The inventive polyol functional polymers ($R^3$=H) may be obtained by reacting a compound of the formula $$R^6-G-(OR^3)_n \qquad \text{VII}$$

where $R^6$ is alkenyl or alkynyl, with a hydroxyl blocking agent followed by hydrosilation with a SiH functional silicone and deblocking of the hydroxyl groups. Direct hydrosilation of compounds of the above formula can also be accomplished in some circumstances but addition to the unsaturated groups $R^6$ competes with addition to the hydroxyl.

SiH functional silanes having hydrolyzable functionality, e.g. methyldichlorosilane or dimethyldichlorosilane may also be used, followed by appropriate silicone polymerization, equilibration or polymer capping reactions. The inventive polymers where $R^2$ is an organo group may either be synthesized by appropriate derivatization reactions (esterification, etherification, urethanization, etc.) with the polyol functional polymers or, alternatively, if the $R^2$ organo group does not interfer with hydrosilation under the conditions employed, by first derivatizing the $R^6$—G—(OH)$_n$ compound, followed by a hydrosilation linking reaction to a SiH functional polymer or silane.

The versatility of the hydroxyl functionality allows mixed $R^2$ groups to be placed on the polymer in close proximity by appropriate control of stociometry. Thus, the dihydroxy terminated silicone prepared by hydrosilation of trimethylolpropane monoallyl ether with a alpha-omega SiH terminated polydimethylsiloxane can be reacted with 2 moles of isocyanatoethyl methacrylate and 2 moles p-toluenesulfonylisocyanate to give a polymer of the structure:

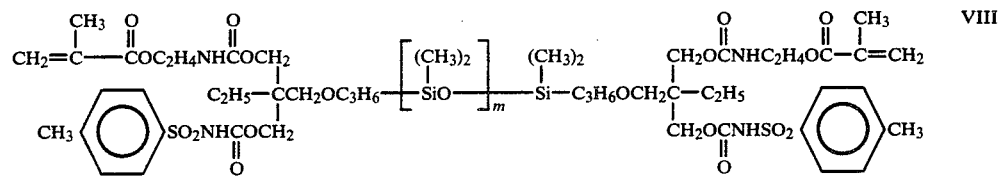

Where m is an integer.

Since polymer binding of polymerizable and accelerating groups inevitably reduces difusional mobility, this ability to provide both polymerizable and acceleration functionality at controlled locations in close proximity provides a means for significantly improving the polymerization efficiency of the molecule.

Similarly, where it is desired to have more than one cure functionality on a polymer, such as epoxy and methacrylate, controlled stociometric reactions allow syntheses of end groups having one of each. Thus, the reaction sequence:

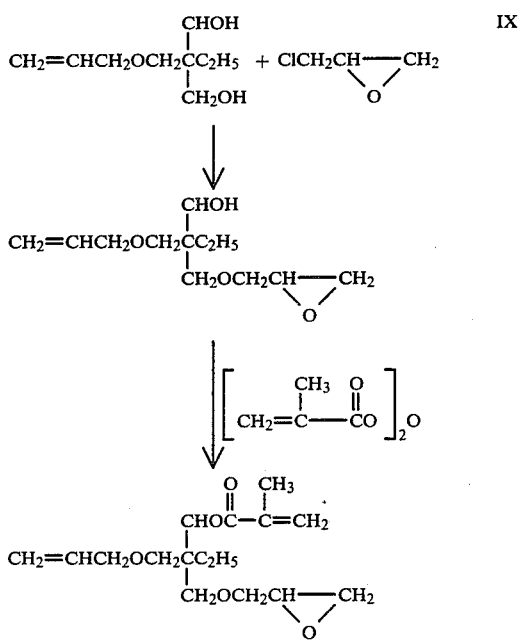

EXAMPLE 1

Trimethylolpropane Monoallyl Ether Dimethacrylate

Trimethylolpropane monoallyl ether (171 g, 1M), methacrylic acid (2.2 equivalents), p-methoxyphenol (0.02 g) and methanesulfonic acid (1.94 g) was stirred in a heptane-toluene (2:1, v:v) mixture and warmed until the azeotrope was collected. After the theoretical amount of water was collected, the reaction mixture was cooled, washed with 10% caustic (500 ml), saturated sodium chloride solution (500 ml), water (500 ml) and dried over sodium sulfate. Concentration and distillation in vacuo (bp 150°–160° C., 0.01 mm Hg) gave the product in 95% purity (by gas chromatography).

EXAMPLE 2

General Hydrosilation Procedure

The allyl dimethacrylate from Example 1 (2 equivalents) was stirred with a $(CH_3)_2SiH$ terminated poly(dimethylsiloxane) and warmed to 55° C. Chloroplatinic acid (0.5 ml, 2% solution in ethyl acetate) was added and the reaction mixture was allowed to warm to 65° C. The reaction mixture was then cooled and any volatile material was removed in vacuo. Molecular weight of the dimethacrylate terminated silicone fluid was calculated by gel permeation chromatography.

EXAMPLE 3

Trimethylolpropane Monoallyl Ether Monoglycidyl Ether

The monoepoxide was prepared by reacting trimethylolpropane monoallyl ether (174 g) with epichlorohydrin (101 g) in dioxane (400 ml) in the presence of potassium tert-butoxide followed by neutralization with acetic and concentration on a rotary evaporator followed by distillation in vacuo, gave the product as a mixture of mono (~92%) and diepoxide.

EXAMPLE 4

Trimethylolpropane Monoallyl Monoglycidyl Ether Methacrylate

The above prepared allyl ether epoxide (1 equivalent) was dissolved in benzene and stirred with pyridine (1 equivalent) and 4-dimethylaminopyridine (0.05 equivalent). Methacrylic anhydride was added dropwise and the temperature was kept below 50° C. The reaction mixture was allowed to stir for several hours after the addition is complete and was monitored by gas chromatography (OV-101 column 25M, 200° C.). When completed, the raction mixture was washed with dilute hydrochloric acid, sodium bicarbonate, and water. Concentration on a rotary evaporator gave the desired monoallyl monoglycidyl ether methacrylate.

EXAMPLE 5

4-Ethyl-4-(Allyloxymethyl)-2,2 dimethyl-1,3 Dioxane

Trimetholalpropane monoallyl ether (174 g) was stirred in toluene (400 ml) with dimethoxypropane (110 g) and toluenesulfonic acid (1 g). The reaction mixture was heated until methanol distilled over and heating continued until distillate was no longer collected. Concentration and vacuum distillaiton (bp 85°–95° C., 1 mm Hg) gave the product in 94% yield.

EXAMPLE 6

1,3-Dioxane Terminated Polysiloxane

The above product of Example 5 (1 equivalent) was stirred with Rhone-Poulenc 620 H2 fluid (0.5 equivalent) and warmed to 60° C. Chloroplatinic acid in ethyl acetate was added and the external heat source was removed. The product was then concentrated on a rotary evaporator.

EXAMPLE 7

ω-Propyleneoxy-2,2-bis-(hydroxymethyl)butane Terminated Polysiloxane and tetra-(N-Tosyl)urethane thereof Trimethylolpropane monoallyl bis-(trimethylsilyl)ether (1 equivalent) was stirred in toluene in the presence of Rhone Poulenc Fluid 620 H2 (0.5 equivalent) and warmed to 60° C. Chloroplatinic acid (2% in ethyl acetate) was added and external heating was removed. The reaction mixture was allowed to stir for one hour and was monitored by infrared spectroscopy. When the reaction was completed, the product was recovered by concentration on a rotary evaporator followed by dissolution in 95% ethyl alcohol with a few drops of acetic acid and stirring for several hours. Removal of all volatile components gives a clear liquid dimethylsilica terminated on each end with groups of the formula:

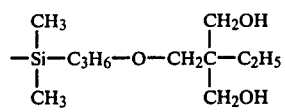

This product was reacted with p-toluenesulfonylisocyanate and gel permeation chromatography of the resulting tetra-(N-Tosyl)urethane showed the product molecular weight to be in the correct theoretical range.

EXAMPLE 8

Allyloxypropanediol Dimethacrylate

Allyloxypropanediol (0.5 equivalents) was stirred in chloroform with pyridine (1 equivalent) and dimethlaminopyridine (0.05 equivalent) and warmed to 50° C. Methacrylic anhydride was added dropwise and stirring was continued until starting diol was no longer detected by gas chromatography. The reaction mixture was then washed with dilute hydrochloric acid, sodium bicarbonate and water. Concentration on a rotary evaporator gave the crude product.

EXAMPLE 9

Polydimethylsiloxanes of the molecular weights shown on Table I were prepared with different acrylic end groups. UV curing formulations were then prepared by adding 2% Darocure ® 953 Photoinitiator. These formulations were cast in 200 mil layers and exposed to a Technocure ® UV lamp (intensity at the substrate approximately 70 mw/cm²). Cure times and Shore A durometer hardness for each sample are given in Table I. The results demonstrate that dimethacrylate terminated silicones of the invention give improved cure speeds when compared to both monomethacrylate and monoacrylate terminated silicones of similar molecular weight.

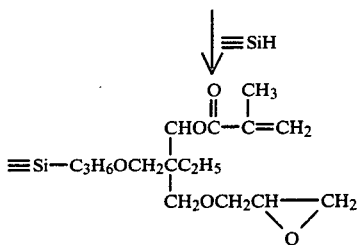

Unsaturated triol and other polyols are especially prefered for use in preparing very high molecular weight silicones where the functional groups are limited to terminal groups. Thus, for linear silicones of 50,000 or higher molecular weight with terminal (meth)acrylic groups, density of 3 or more methacrylic units at each end of the molecule is desireable for rapid curing characteristics.

In addition to trimethylolpropane monoallyl ether, other compounds $R^6$—G—$(OH)_n$ which may be suitably employed include pentaerythitol allyl ether; glycerin allyl ether; inositol allyl ether; allyl ethers of sugar alcohols such as sorbitol and mannitol; and allyl glucoside. For such compounds, the G groups would have the respective formulas:

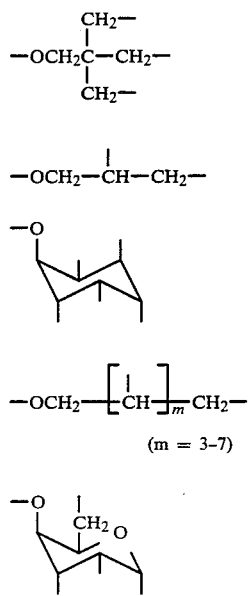

Further compounds $R^6$—G—$(OH)_n$ include compounds prepared by methods described in J. Org. Chem. 1985 2003, substituting unsaturated aldehydes for the saturated aldehydes. Thus a compound of the formula

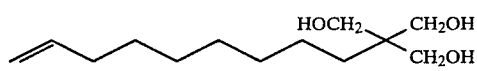

has been prepared from undecylaldhyde, and formaldehyde in the presence of sodium hydroxide. Similarly,

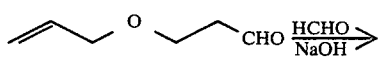

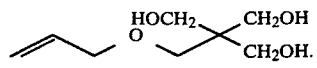

Unsaturated arborol compounds having 6,9 or even higher numbers of hydroxyl containing branches may be likewise prepared by adaption of methods described in J. Org. Chem., 1985, 2003.

As mentioned above, it is usually necessary to block the hydroxyl functionalities before hydrosilation. Suitable blocking agents include trimethylchlorosilane and others which will be apparent to persons skilled in the art.

For diol compounds such as the trimethylolpropane monoallyl ether, blocking agents which produce 1,3-dioxane or 1,3-dioxolane structures may be employed to product unique intermediate compounds which are a further aspect of the invention.

Suitable such blocking agents include 2,2-dimethoxypropane, and benzaldehyde acetone formaldehyde and cyclohexanone.

Related structures are allylidene acetal terminated silicones. The procedures of U.S. Pat. No. 3,311,674 may be readily adopted by those skilled in the art using diol terminated silicones of the invention and allylaldehyde to yield novel allylidene acetal terminated silicones, the terminal groups having the formula.

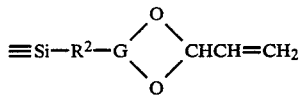

Such compounds are particularily useful when cured with organic or silicone compounds having plural alkylthiol functionality. The cure reaction may be catalyzed by either acid or free radical catalysts, including free radical photoinitiators such as benzophenone, benzoin diethoxyacetophenone, etc. and cationic photoinitiators such as triphenylsulfonium hexafluorophosphate or diphenyliodonium hexafluoroarsenate. Suitable alkylthiol functional compounds include pentaerythitoltetrakis-mercapto acetate and other useful silicone alkyl triols comprise the 2-mercaptoacetate esters of diol or polyol silicones of the invention.

Further novel polymers which are both radically and cationically polymerizable are represented by formula I above where the $R^3$ groups are

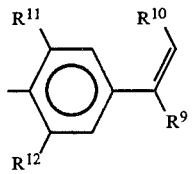

where $R^9$ and $R^{10}$ are both H or one of $R^9$ and $R^{10}$ is H and the other methyl, $R^{11}$ and $R^{12}$ are H, lower alkyl or if $R^{10}$ is not methyl, $R^{11}$ and $R^{12}$ may also be alkoxy. Such compounds may be readily synthesized by known esterification methods from diol or polyol substituted silicones of the invention and corresponding vinyl phenols such as p-vinyl phenol and vinyl guiacol.

The invention is further illustrated by reference to the following nonlimiting examples.

TABLE I

Ultraviolet Photoinitiated Cure Rates of Dimethacrylate Terminated Siloxane

| Siloxane (Meth)acrylate End Group | MW | Durometer Shore A | Cure Time |
|---|---|---|---|
| $\text{—Si(CH}_3\text{)}_2\text{—C}_3\text{H}_6\text{—O—CH}_2\text{C(C}_2\text{H}_5\text{)(CH}_2\text{OCNHC}_2\text{H}_4\text{OC(O)C(CH}_3\text{)=CH}_2\text{)}_2$ | 1800 | 90 | 20 sec. |
| $\text{—Si(CH}_3\text{)}_2\text{—C}_3\text{H}_6\text{—O—CH}_2\text{C(C}_2\text{H}_5\text{)(CH}_2\text{OC(O)C(CH}_3\text{)=CH}_2\text{)}_2$ | 1800 | 50 | 10 |
| $\text{—Si(CH}_3\text{)}_2\text{—C}_3\text{H}_6\text{—OC(O)C(CH}_3\text{)=CH}_2$ | 1700 | 10 | 25 |
| $\text{—Si(CH}_3\text{)}_2\text{—C}_3\text{H}_6\text{—O—CH}_2\text{C(C}_2\text{H}_5\text{)(CH}_2\text{OC(O)C(CH}_3\text{)=CH}_2\text{)}_2$ | 6000 | 33 | 10 |
| $\text{—Si(CH}_3\text{)}_2\text{—C}_3\text{H}_4\text{—OC(O)C(CH}_3\text{)=CH}_2$ | 5000 | <10 | 30 sec. |
| $\text{—Si(CH}_3\text{)}_2\text{—C}_3\text{H}_6\text{—O—CH}_2\text{C(C}_2\text{H}_5\text{)(CH}_2\text{OC(O)C(CH}_3\text{)=CH}_2\text{)}_2$ | 12,000 | 15 | 30 |
| $\text{—Si(CH}_3\text{)}_2\text{—C}_3\text{H}_4\text{—OC(O)CH=CH}_2$ | 12,000 | 8 | >45 |
| $\text{—Si(CH}_3\text{)}_2\text{—C}_3\text{H}_6\text{—O—CH}_2\text{C(C}_2\text{H}_5\text{)(CH}_2\text{OC(O)C(CH}_3\text{)=CH}_2\text{)}_2$ | 28,000 | 8 | 30 |
| $\text{—Si(CH}_3\text{)}_2\text{—C}_3\text{H}_4\text{—OC(O)CH=CH}_2$ | 28,000 | 4–5 | >30 |
| $\text{—Si(CH}_3\text{)}_2\text{—C}_3\text{H}_6\text{—OC(O)C(CH}_3\text{)=CH}_2$ | 28,000 | 0–1 | >60 |

EXAMPLE 10

A polydimethylsiloxane terminated with photinitator groups of the formula

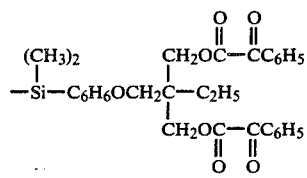

is prepared by the method of U.S. Pat. No. 4,507,187 at Col. 2, ln. 60-Col. 3 ln. 3 except that the allyl alcohol is omitted and in its place is substituted an equivalent amount of the bis hydroxy terminated product from Example 7.

We claim:

1. A polydiorganosiloxane having at least one repeat unit represented by the formula

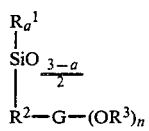

where $R^1$ is an organo group; $R^2$ is alkylene or alkenylene; G is a n+1 valent hydrocarbon, oxyhydrocarbon or poly(oxyhydrocarbon) radical in which some or all of the hydrogen atoms may optionally be substituted by halogen atoms; the $R^3$ groups are H, groups having epoxy functionality, styryl groups which may be optionally substituted, organic groups having photoinitiator activity, aryl sulfonyl carbamyl groups, mercaptoacetyl groups, mixtures of one or more said groups or mixtures of one or more said groups with one or more groups having (meth)acrylic functionality; n is an integer of 2 or more provided that when n is 2 and one of $R^3$ is H then the other $R^3$ group is also H; and a is 0, 1 or 2.

2. A polydihydrocarbylsiloxane as in claim 1 terminated with groups of formula (I) where a is 2.

3. A polydiorganosiloxane as in claim 1 where the $R^3$ groups are said mixtures with one or more groups having (meth)acrylic functionality.

4. A compound as in claim 3 where the $R^3$ (meth)acrylic groups are selected from acryl, methacryl, or methacryloxyethylcarbamyl.

5. A compound as in claim 1 wherein n is 3 or more.

6. A compound as in claim 1 where the $R^3$ groups comprise a mixture of groups having (meth)acrylic and epoxy functionality.

7. A compound as in claim 1 where $R^2$ is a propylene group.

8. A compound as in claim 1 wherein the $R^3$ groups comprise a mixture of groups having (meth)acrylic and arylsulfonylcarbamyl groups.

9. A compound as in claim 1 where $R^3$ is a photoinitiating group.

10. A compound as in claim 9 where the photoinitiating groups is selected from

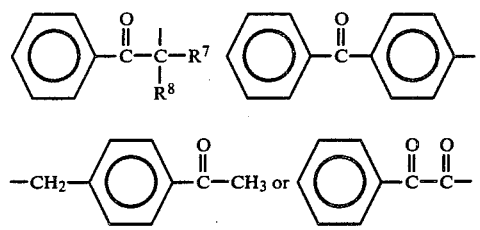

where $R^7$ is H or alkyl and $R^8$ is hydrocarbyl or $R^7$ and $R^8$ together with the carbon atom to which they are attached comprise a cyclic hydrocarbyl group.

11. A compound as in claim 1 where $R^3$ is

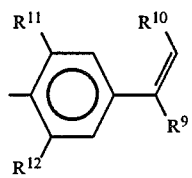

where $R^9$ and $R^{10}$ are both H or one of $R^9$ and $R^{10}$ is H and the other methyl, $R^{11}$ and $R^{12}$ are H, lower alkyl or, if $R^{10}$ is not methyl, alkoxy.

12. A compound as in claim 1 where $R^3$ is mercaptoacetyl.

13. A compound as in claim 1 where one said $R^3$ group is included an epoxy group.

14. A compound as in claim 13 where the $R^3$ epoxy group is glycidyl.

15. A polyorganosiloxane which includes at least one unit of the formula

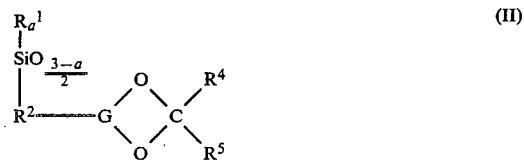

where $R^1$ is a hydrocarbyl group, $R^2$ is alkylene, G is a trivalent hydrocarbon or oxyhydrocarbon group, and $R^4$ and $R^5$ are H or hydrocarbyl.

16. A compound as in claim 15 having at least two said units of formula II.

17. A compound as in claim 16 where $R^4$ is a vinyl group.

18. A cureable composition comprising a compound having plural alkylthiol functionality, a compound as in claim 17 and a free radical or cationic photoinitiator.

19. A cureable composition comprising a compound as in claim 11 and a free radical or cationic photoinitiator.

20. A cureable composition comprising a compound as in claim 3 and a free radical initiator.

21. A cureable composition as in claim 20 wherein the free radical initiator is a photoinitiator.

22. A cureable composition comprising a compound as in claim 8 and a peroxy catalyst.

23. A polydiorganosiloxane as in claim 1 where the $R^3$ groups are H.

24. A polydiorganosiloxane as in claim 23 where n is 3 or more.

* * * * *